United States Patent Office 3,086,922
Patented Apr. 23, 1963

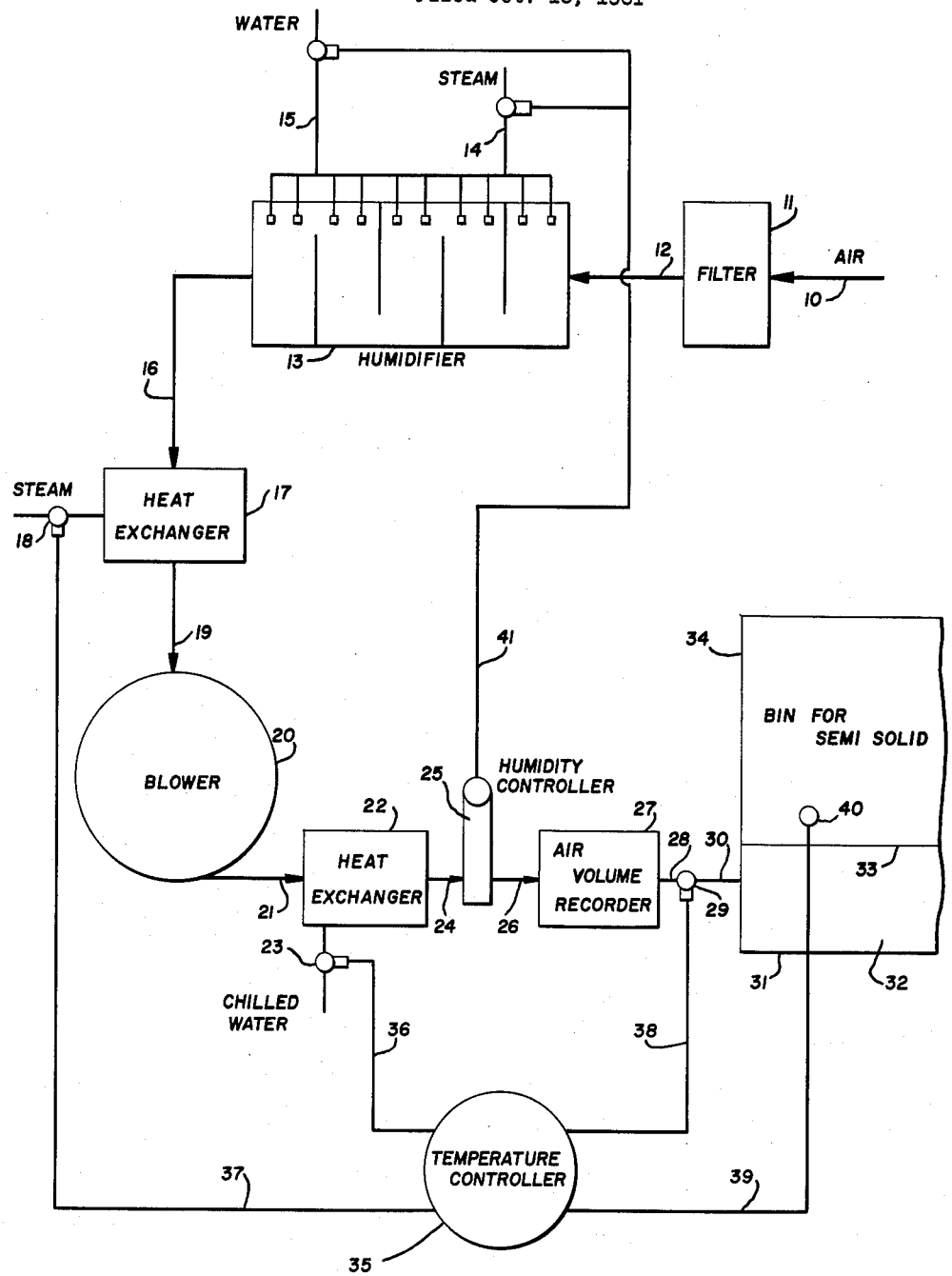

3,086,922
METHOD FOR THE PRODUCTION OF
MICROBIAL INSECTICIDES
Byron J. Mechalas, San Jacinto, Calif., assignor to Nutrilite Products, Inc., Buena Park, Calif., a corporation of California
Filed Oct. 13, 1961, Ser. No. 145,002
18 Claims. (Cl. 195—96)

This invention relates to microbial insecticides. More particularly, the invention relates to a novel microbial insecticide and to the production and utilization thereof.

This application is a continuation-in-part of co-pending application Serial No. 4,543, filed January 25, 1960, and now abandoned.

The effective control of insects presents a constant and perplexing problem. The present annual expenditure in the United States for chemical insecticides alone is approximately one hundred million dollars. Chemical insecticides are inherently undesirable in many respects. The high order of toxicity toward forms of life other than insects which characterizes most chemical insecticides is seriously objectionable. The toxicity problem presents a hazard, not only to workers who must deal directly with the toxic insecticidal compositions, but also to the ultimate consumer of treated agricultural products which may be expected to carry residual quantities of the insecticide. The hazard of residual insecticide toxicity is particularly acute for want of an effective method of control by Government authorities. Most chemical insecticides are also disadvantageously non-specific, and hence kill not only undesirable insect pests, but also large numbers of beneficial insects such as pollinators and predators. The normal entomological balance of nature is accordingly disturbed. Moreover, insects frequently develop resistance to chemical insecticides, necessitating periodic formulation and type changes.

Microbial control of insects offers significant advantage in comparison with chemical insecticides. Insect pathogens are harmless and non-toxic for other forms of life, and hence leave no objectionable residues. Microbial insecticides demonstrate a relatively high degree of specificity and hence tend to protect beneficial insects, such as pollinators, parasites, and predators. Moreover, a susceptible insect host develops resistance to microbial pathogens only quite slowly, if at all. Microbial insecticides are effectively applied as dusts or sprays, may be introduced or colonized, may be used with chemical insecticides, both compatibly and synergistically, and may be used in combination with parasites and predators. Low dosages are required.

Diseases of insects, now known to be caused by microorganisms, including those which attack the honeybee and the silkworm, were familiar before the time of Aristotle. Early efforts to protect such beneficial insects yielded some comprehension of the nature of insect infectious diseases. Bassi in 1834 proved that a fungus disease of the silkworm could be caused by a microorganism.

Utilization of infectious diseases to control insect pests has long intrigued the art. In 1879 Metchnikoff succeeded in infecting larvae of the wheat cockchafer by inoculating a pot of soil containing insects with a pathogenic fungus. The success attained by Metchnikoff inspired Krasilshchik of the University of Odessa to establish a laboratory in 1884 for the purpose of producing spores of the same fungus on a large scale.

Berliner, in 1911, published a report in Germany concerning a disease of the larvae of the Mediterranean flour moth caused by a spore-forming bacterium, later named *Bacillus thuringiensis*.

In this country, interest in the microbial control of insects stimulated the establishment under Dr. Edward A. Steinhaus of a laboratory at the University of California in 1945, to investigate the possibility of the microbial control of the alfalfa caterpillar. In 1956, Dr. Steinhaus recognized that much of what had been accomplished in the way of microbial control of insects had been based on trial-and-error methods, and that adequate fundamental knowledge on which to base microbial control procedures had not been developed. Dr. Steinhaus, in 1956, was of the view that the development of a satisfactory method for the large scale commercial production of such microbial insecticides was a problem of primary significance.

It is a primary object of this invention to provide a novel and highly efficacious method for the production and, more particularly, the commercial production of a microbial insecticide.

It is an additional important object of the invention to provide a surface culture technique for the production of a microbial insecticide. This technique is designed to retain all toxic components both soluble and insoluble.

It is an additional primary object of the invention to provide a microbial insecticide comprising the entire culture including the spores, soluble and insoluble metabolic by-products of the Bacillus and the residue of the nutrient medium on which *Bacillus thuringiensis* is grown and sporulated.

The preservation of all of these ingredients provides for a microbial insecticide of a potency substantially higher than that produced when these products are discarded during processing by more conventional methods.

It is also an object of the invention to provide a method for the microbiological control of insects which contemplates utilization as a microbial insecticide of the entire culture including all metabolic by-products and including the residual nutrient medium on which *Bacillus thuringiensis* is grown and sporulated.

It is a more specific object of the invention to provide a method useful for the production on a commercial scale of a microbial insecticide containing spores of *Bacillus thuringiensis*.

It is an additional object of the invention to provide a method effective to provide a microbial insecticide derived from *Bacillus thuringiensis* characterized by an organism and spore count higher than achieved by certain prior art methods for producing such insecticides. Included in this will be the entire bacterial culture, its metabolic products and the residual nutrient medium. This results in a product of unusually high potency; soluble components are not lost during processing.

A further object of the invention is to provide an improved method for the microbiological control of insects including larval stages of Lepidoptera and Diptera.

A more specific object of the invention is to provide a method feasible for the production of microbial insecticides derived from *Bacillus thuringiensis* in a quantity adequate for the commercial control of Lepidoptera and Diptera.

I have discovered that the composition produced by my method is characterized by the presence of a heat stable, soluble component toxic to insects and more specifically toxic for larvae of diptera. It is the inclusion of this component that contributes to the unusually high potency of the products of this invention.

It is another object of the invention to provide a novel apparatus useful for the commercial large-scale production of a microbial insecticide by the propagation and sporulation of *Bacillus thuringiensis*.

The biological insect control method of the invention contemplates feeding the insects to be controlled the entire culture of sporulated *Bacillus thuringiensis*, as distinguished from an extract or spore concentrate derived from such a culture as in the prior art. Accordingly, the invention provides a semi-solid, surface culture propagation technique effective to provide product comprising the entire sporulated culture, which is of requisite toxicity to be useful in the commercial control of insects.

More specifically, the invention provides a microbial insecticide of high spore content and potency produced by inoculating the surface of a nutrient medium with *Bacillus thuringiensis*, passing first stage air into said inoculated medium at a pressure of not more than about five pounds per square inch and at a rate of from about 0.2 to about 1.2, and preferably about 1.0 volume of air per volume of medium per hour until substantial sporulation occurs, said first stage air being introduced into said medium at a temperature of from about 25° C. to about 35° C. and at a relative humidity of at least 95%, maintaining said medium at a temperature of from about 25° C. to about 35° C. substantially throughout the period said first stage air is passed therethrough, and thereafter passing second stage air having a relative humidity substantially lower and a temperature not in excess of 60° C. but substantially higher than said first stage air through said sporulated nutrient medium to reduce the moisture content thereof to not more than about 10% by weight. During this latter step most of the moisture is taken off by evaporation with only a negligible loss of the water soluble products of the fermentation.

The art is familiar with nutrient media useful for the propagation of *Bacillus thuringiensis*. Such media appropriately contain protein and carbohydrate materials and may conform to those disclosed in Prescott and Dunn, "Industrial Microbiology," McGraw-Hill, 195, pp. 68, 73, 90, 501–507, and 527. Alternatively media consisting essentially of essential mineral-, vitamin-, and nitrogen-supplying materials may be utilized, such as are present in ordinary nutrient agar, as disclosed by Steinhaus, Hilgardia 20, p. 368 et seq. (1951). A nutrient medium found to be particularly useful in the production of the microbial insecticides contemplated by the invention comprises:

| | Weight, percent |
|---|---|
| Soy bean meal | 30 to 40 |
| Sugar (e.g. dextrose) | 15 to 20 |
| Fish meal | 15 to 20 |
| Dried milk | 15 to 20 |

*Bacillus thuringiensis*, in common with Bacillus species generally, is an amylase producer. Accordingly, in lieu of carbohydrates other than starches, an appropriate nutrient medium may comprise a mixture of bran and expanded perlite. *Bacillus thuringiensis*, in utilization of such a medium produces amylase which, in turn, breaks down the starch content of the bran to assimilable carbohydrates such as sugars. In a preferred embodiment, the nutrient medium is adsorbed onto a particulate inorganic carrier and nutrient substrate. Appropriate organic substrates include bran, wheat middlings, red dog flour, alkalfa meal, corn meal, peanut meal, oat hulls, rice hulls oatmeal, corn stalks, corn cobs, kudzu vines, sorghum stalks, beet pulp, soybean vines, sweet potato vines, sweet potatoes, Irish potatoes, cottonseed meal and the like. Vegetable materials utilized as a carrier for or as a part of the nutrient medium are preferably comminuted to provide a high ratio of surface area to volume and hence encouage vigorous bacterial growth. Experimental evidence indicates that organic carrier materials such as bran afford appreciable quantities of nutrients to *Bacillus thuringiensis*.

Utilization of inorganic carriers affords a microbial insecticide culture which may be comminuted to a selected mesh size more readily than comparable cultures propagated on media composed entirely from organic materials. Preferred inorganic carriers include expanded volcanic glasses such as perlite, obsidian, and the like; exfoliated vermiculite, pumice, volcanic ash, calcined diatomaceous earth, and similar materials preferably characterized by a substantial degree of friability requisite to facilitate comminution of microbial insecticide culture.

Optimum results are obtained with mixtures of inorganic and organic carrier materials. The invention generically contemplates such mixtures in all relative proportions. Preferred mixed carrier media comprise from about 20% to about 80% by volume of inorganic material and about 80% to about 20% by volume of organic material. A particularly appropriate carrier medium comprises from about 20% to about 80% by volume of expanded perlite and about 80% to about 20% by volume of an organic material such as bran.

Microbial insecticides are appropriately produced in accordance with the method of the invention in an apparatus such as that schematically represented in FIGURE 1. Referring to the drawing, air is passed through line 10, filter 11 and line 12 into humidifier 13 which is provided with means 14 for the controlled introduction of steam and means 15 for the controlled introduction of water. Humidified air passes from humidifier 13 through line 16 into heat exchanger 17 which is provided with means 18 for the controlled introduction of steam. Heated and humidified air passes from heat exchanger 17 through line 19 into blower 20 and thence through line 21 into heat exchanger 22 which is provided with means 23 for the controlled introduction of chilled water. From heat exchanger 22, the air passes through line 24 into humidity controller 25. Properly heated and humidified air exits from humidity controller 25 through line 26, air volume recorder 27, line 28, control valve 29, and line 30 in bin 31.

Bin 31 is constructed and arranged for the effective growth and sporulation of *Bacillus thuringiensis*, and includes a lower air chamber 32 separated by foraminous partition 33 from an upper propagation chamber 34 which contains inoculated nutrient medium when the apparatus is in use. The arrangement is such that air, at the proper temperature and humidity, is passed upwardly from chamber 32 through foraminous partition 33 into and through inoculated nutrient medium contained in propagation chamber 34.

Temperature controller 35 is operatively connected by lines 36, 37, 38 and 39, respectively, to temperature probes, not shown, positioned in control means 18, 23, and 29 and to temperature probe 40 positioned in chamber 34. Humidity controller 25 is operatively connected by line 41 to control means 14.

In general, the preparation of a microbial insecticide as contemplated by the invention entails the steps of (a) preparing an inoculant of the *Bacillus thuringiensis* microorganism to be utilized; (b) inoculation of a nutrient medium with the prepared inoculant; (c) propagation of the inoculated medium; (d) reducing the moisture content of the propagated medium to a proper low level; (e) comminuting the dried propagated medium and metabolic products to a particle size appropriate for utilization as an insecticide.

In the preferred practice of the invention, the inoculant is prepared in two steps, i.e. a small flask culture is first produced and utilized in the preparation of a comparable culture in significantly larger volume.

The preparation of a flask culture entails the initial steps of placing the appropriate nutrient medium in a flask, and inoculation of such medium with a pure *Bacillus thuringiensis* culture, such as may be grown in conventional manner in a slant tube. An appropriate flask culture medium may contain the following ingredients:

| | Percent by weight |
|---|---|
| Water | 90 to 98 |
| Corn steep | 0.4 to 2.0 |
| Dextrose | 1.0 to 3.0 |
| Yeast autolysate | 0.25 to 1.0 |
| Sodium hydroxide to pH 7. | |

The nutrient medium is heat sterilized, preferably for at least 15 minutes, cooled to 25 to 30° C., inoculated with pure *Bacillus thuringiensis* culture from a slant tube and placed on a shaker for about 8 hours at a temperature of about 28° C. to 30° C. If satisfactory growth is evidenced at the end of the 8-hour period, the flask culture may be transferred to an inoculating bottle.

The seed-tank culture is prepared normally in a large tank. A nutrient medium of the same type as that utilized with the flask culture is preferably employed. Corn oil or any other suitable anti-foam agent may be introduced, if desired, to control foam. The medium in the tank is sterilized for 20 minutes at 120° C., cooled and inoculated with the flask culture and agitated with air at 25° C. to 35° C., e.g. at 30° C. for about 20 hours. The seed-tank culture is utilized to inoculate a particulate nutrient substrate of the type previously described.

As a specific example, a substrate material, such as bran or expanded perlite, is coated or impregnated with additional nutrient materials in approximately the following proportions, by weight:

| | Percent by weight |
|---|---|
| Bran or perlite | 85 to 90 |
| Soy bean meal | 4.5 to 7 |
| Sugar (dextrose) | 3 to 5 |
| Lime | 0.3 to 0.6 |
| $CaCl_2$ | .02 to .04 |
| NaCl | .07 to .11 |

Water is added to the foregoing mixture to a moisture content of about 15% to 20% by weight, and to provide a pH of from about 6 to about 8, the pH being adjusted to about this range, if necessary. The mixture is steam sterilized and cooled to a temperature of about 37° C.

Seed-tank inoculant is then sprayed onto the nutrient carrier substance preferably until the moisture content of the mixture is within the range of from about 50% to about 65% by weight. The inoculated nutrient material is transferred to a bin of the type described in reference to FIGURE 1. First stage air at a temperature of about 28° C. to about 34° C. is introduced at a relative humidity of at least 70% and preferably about 80% to about 100%. The introduction of first stage air under the aforementioned conditions of temperature and humidity is continued until substantial sporulation has occurred. Normally, such sporulation is achieved within a time period from about 30 to about 48 hours. Second stage air is then introduced at a temperature of about 45° C. to about 60° C. and at a low relative humidity for a time period requisite to reduce the moisture content of the sporulated material to not more than about 10%, and preferably to from about 3% to about 6% by weight. Normally, a product is satisfactorily dried after second stage air has been introduced for about 40 hours.

If desired, the sporulated nutrient medium and carrier substrate may be agitated to break down the material and expedite drying, prior to or during contact with second stage air.

The dried sporulated product may be comminuted to a particle size appropriate for utilization as a dust or a wettable powder, in admixture with chemical insecticides, or the like. In general, it is preferable to effect comminution at a temperature not in excess of about 60° C. to a particle size of −80 mesh. Comminution at temperatures substantially in excess of 60° C. may materially reduce the spore count of the microbial insecticide product.

The particle size is not critical. However, it should be such as to provide the most efficient distribution or coverage of the areas treated. At the same time it should not be so fine as to bring about mechanical problems especially when applied as a dust. The size will depend largely upon how the material is to be used. Obviously, if it is to be mixed with a liquid and sprayed on, a finer powder may be advantageous than where it is applied as a dust.

To summarize, the incubation period should be at least about 30 hours and preferably about 35 hours at temperatures of about 25° C. to 35° C. and preferably about 28° C. to about 34° C. For periods above about 35 hours of incubation, little change in spore count occurs.

The relative humidity is preferably about 95% or more, 97–100% being optimum, for the first stage air employed during the incubation period. The function of the moist air is to maintain the moisture content of the substrate at the optimum moisture content of about 55–62% of the inoculated substrate and also to aid in active sporulation. At low relative humidities the rate of sporulation is adversely affected even though the moisture content of the particles is above 50%.

The substrate may be inoculated with tank inoculum or with dried spores. When the dried spores are used, it is added just before the mass is placed in the sporulation bins and the moisture is then adjusted. Preferably a temperature of about 50° C. is used for inoculation with the dried spores since this appears to heat shock the spores, initiating a more rapid germination. Approximately one pound of 150 BSG material is used per 300 pounds of substrate on a dry basis. After inoculation, the temperature is dropped to approximately about 28 to 34° C. With either wet or dry inoculation it is advantageous to carry out the early portions of the sporulation at a temperature of about 34 or 35° C. and later the temperature may be dropped to about 32° C.

The air employed for the second stage should have a substantially lower relative humidity than that used in the first stage. It is preferably of the order of 10 to 20% and advantageously should be well below 50 to 60%. The temperature of the second stage treatment should be above 35° and preferably of the order of 50 to 55° C. This promotes more rapid drying. The process is best carried out both in the first and second stages as rapidly as possible so as to eliminate or minimize the possibility of contamination of the material with other organisms. Care should be taken to use clean air with as little contamination as possible with other organisms which might develop in the mass particularly during the sporulation and early portion of the drying stages.

EXAMPLE I

A. *Preparation of Inoculant Culture*

Approximately 100 ml. of a nutrient medium of the following composition was placed in a 500 ml. flask.

| | Percent by weight |
|---|---|
| Water | 95.4 |
| Corn steep | 1.6 |
| Peptone | 1.0 |
| Dextrose | 2.0 |
| | 100.0 |

The nutritive medium in the flask was adjusted to PH 7 with sodium hydroxide, heat-sterilized and cooled to 28° C. The sterilized medium was then inoculated with a pure culture of *Bacillus thuringiensis* from a slant tube, and the flask was placed on a shaker for eight hours to produce a flask culture from which a seed-tank culture was produced.

A seed tank was filled with eighty gallons of a nutrient medium having a pH of 7.1 and consisting of 16 pounds of dextrose, eight pounds of corn steep, four pounds of peptone, twelve ounces of sodium hydroxide and two liters of corn oil as a foam-control agent. The medium in the seed tank was sterilized for twenty minutes at 120° C. and 15 p.s.i. pressure cooled to about 30° C. and inoculated with 100 ml. of the flask culture of *Bacillus thuringiensis*. The pH of the inoculated seed-tank culture was 6.7. Air, at a pressure of about 3 pounds per square inch, at a temperature of about 30° C. was introduced into the inoculated seed-tank culture for about 16 hours at a rate of about 3 volumes per volume of culture per hour. Active growth of the Bacillus thuringiensis was evident. The pH of the seed-tank culture after 16 hours was 5.1. The eighty gallons of seed-tank culture so produced provided the inoculant culture for the production of the microbial insecticide.

B. *Preparation of Microbial Insecticide*

Two hundred eighty-three and three-fourths pounds of a nutrient medium having a pH of 6.6 and consisting of the following ingredients was prepared:

| | | |
|---|---|---|
| Wheat bran | pounds | 225 |
| Soy bean meal | do | 22.5 |
| Dextrose | do | 11.25 |
| Fish meal | do | 11.25 |
| Dried milk | do | 11.25 |
| Hydrated lime | do | 2.5 |
| Tap water | gallons | 5 |

The nutrient medium was heat sterilized for sixty minutes, cooled to about 30° C., and inoculated with 40 gallons of the seed-tank culture. The pH of the inoculated medium was 6.35, the moisture content was 57% by weight, and the ambient relative humidity was 38%. About one hour subsequent to inoculation, the temperature of the medium had risen to 37° C. indicating growth of *Bacillus thuringiensis* had started.

First stage air was then introduced into the medium at a relative humidity of about 70% to about 100% at an average temperature of about 25° C. to about 30° C. and at an average rate of from about 0.2 to about 0.3 volume per volume of inoculated medium per minute. The introduction of first stage air was continued for 47 hours at which time the pH of the inoculated medium was 7.0, moisture content was 44% by weight, and substantial growth and sporulation of the *Bacillus thuringiensis* was apparent. Throughout the 47 hour period during which first stage air was introduced, the temperature of the inoculated medium was maintained at an average of from about 28° C. to about 30° C.

Introduction of second stage air was dry as possible and having an average temperature of from about 40° C. to about 55° C. was then initiated and continued for about 46 hours to produce a sporulated product having a moisture content of 4% by weight, and a pH of 7. The product which demonstrated spore count of $9.15 \times 10^9$ spores per gram and was comminuted to 95% minus 80 mesh to provide an excellent microbial insecticide.

EXAMPLE II

Following the same procedure and utilizing 252 pounds of starting materials of the same composition in substantially the same relative proportion as described in Example I, 171 pounds of microbial insecticide was produced. First stage air was introduced for about 27 hours under the same conditions of temperature and humidity and at the same rate as described in Example I. The average temperature of the inoculated medium during the passage of the first stage air therethrough was 34.3° C. The moisture content of the sporulated medium at the termination of the introduction of first stage air was about 60% by weight.

Thereafter, second stage air having substantially the same properties as the second stage air employed in Example I was passed through the sporulated medium for about 41 hours to provide a final product having a moisture content of about 5% and a spore count of $6.59 \times 10^9$ spores per gram.

The product was comminuted to 95% through 80 mesh. Aqueous dispersions containing 1, 0.5 and 0.25 gr. of the comminuted material per 100 ml. of water were prepared. Alfalfa leaves were dipped into each of the aqueous dispersions and fed to larvae of the alfalfa caterpillar, *Coleas philodice eurytheme*. Tests were replicated five times using 5 larvae per group to provide a total of twenty-five larvae per sample. The results are reported in Table 1.

TABLE 1

| Spore count | Concentration | Percent mortality | | | |
|---|---|---|---|---|---|
| | | Day 1 | Day 2 | Day 3 | Day 4 |
| $6.59 \times 10^9$ | 1 gm./100 ml. | 2 | 50 | 94 | 100 |
| | 0.5 gr./100 ml. | 0 | 0 | 62 | 98 |
| | 0.25 gr./100 ml. | 0 | 0 | 68 | 96 |

EXAMPLE III

A microbial insecticide product produced in a manner comparable to that described in Example II but in a total processing time of about 50 hours, first stage air being introduced for twenty-one hours and second stage air for thirty-nine, demonstrated a spore count of $4.17 \times 10^9$ per gram.

Insect mortality tests were conducted in the same manner and with the same type of insect as described in Example II. The results are reported in Table 2.

TABLE 2

| Spore count | Concentration | Percent mortality | | | |
|---|---|---|---|---|---|
| | | Day 1 | Day 2 | Day 3 | Day 4 |
| $4.17 \times 10^9$ | 1 gm./100 ml. | 0 | 0 | 78 | 98 |
| | 0.5 gr./100 ml. | 0 | 0 | 46 | 88 |
| | 0.25 gr./100 ml. | 0 | 0 | 20 | 64 |

It is apparent from a comparison of the data of Table 1 with the data of Table 2 that the toxicity of the microbial insecticide products of the invention may vary directly with the spore count.

EXAMPLE IV

A series of microbial insecticide products were prepared by procedure described in reference to Example I, with specific conditions and results as indicated in Table 3.

TABLE 3

| | Age of inoc., hrs. | Amt. of inoc., ml. | Vol. seed tank, gal. | pH | Age of seed tank, hrs. | Amt. used, gal. | Medium | Amt. | pH start | pH after start | Semi-solid moist., percent | Semi-solid temp., ° C. |
|---|---|---|---|---|---|---|---|---|---|---|---|---|
| BT-901 | 24 | 100 | 80 | 7.3 | 19½ | 40 | Std | 284 | 9.0<br>9.4 | 7.0<br>6.7 | 59 | 32<br>38 |
| BT-902 | 72 | 100 | 10 | 7.3 | 19½ | 40 | Std | 284 | 9.2<br>9.5 | 7.0<br>6.7 | 59 | 30<br>36½ |
| BT-903 | 48 | 250 | 80 | 7.2 | 20 | 40 | Std | 284 | 10.2 | 6.5<br>6.6 | 59 | 31<br>36 |
| BT-905 | 72 | 100 | 80 | 7.2 | 19½ | 40 | Std | 284 | 10.0 | 6.8<br>7.0 | 58 | 31<br>36 |
| BT-906 | 72 | 100 | 80 | 7.2 | 19½ | 40 | Std | 284 | 10.1 | 7.5<br>7.0 | 59 | 32<br>36 |

TABLE 3—Continued

| | Change of pH | Time to start growth, hrs. | Time of growth | Time to dry | Change pH | Yield | Rel. humidity, 1-5 hr., percent | Rel. humidity, percent | Bran moisture, 40-48 hrs., percent | Temp., inc. to 0° C. | Time of Temp. inc., hrs. | Spore count ×10⁹ |
|---|---|---|---|---|---|---|---|---|---|---|---|---|
| BT-901 | 6.7 / 7.5 / 7.8 | 3 | 45 | 71 | | 204 | +70 | +80 | 41 | 34 / 36 | 9 / 14 | 11.6 |
| BT-902 | 6.7 / 7.6 / 7.8 | 3 | 45 | 72 | 7.8 / 7.5 / 7.4 | 197 | +80 | 90 | 43 / 46 | 32 / 33 | 9 / 10 | 10.5 |
| BT-903 | 6.6 / 8.0 | 3 | 46 | 91 | | 191 | +80 | 90 | | 34 / 34 | 9 / 12 | 9.6 |
| BT-905 | 7.0 / 7.9 / 7.5 | 3 | | 78 | | 198 | +80 | +80 / 90 | | 34 | 11 | 9.2 |
| BT-906 | 7.0 / 7.4 / 7.5 | 3 | 45 | 72 | 7.9 / 7.5 | 197 | +80 | 90 | 37 | 35 / 38 | 9 / 12 | 11.3 |

Bio-assays of the microbial insecticide products of this example were conducted as follows:

Insectary reared larvae of the salt marsh caterpillar, *Estigmeno acrea* (Dru.), were employed as test insects. The host insects were eight days old, the day of hatch being regarded as the first day, when subjected to the test. The host insects were selected for uniform size and healthy appearance.

Fifty larvae were used for each microbial insecticide product tested. For each test, ten one-half pint cardboard food containers covered with a standard 110 mm. petri dish bottom and containing five larvae were utilized.

Each microbial insecticide product was tested in concentrations of 0.1 gram and 0.2 gram per 100 ml. of water prepared by blending of the product with water in a Waring Blendor, followed by separation and appropriate dilution with water.

The test insects were fed "bouquets" of alfalfa made by securing with a cotton plug the stem end of a single three-inch long sprig of alfalfa in a 50 mm. x 15 mm. vial of water. The "bouquets" of alfalfa were dipped into beakers of the material being tested and agitated until thoroughly wet. The "bouquets" were then air dried and one "bouquet" added to each carton of five larvae.

The larvae were allowed to feed on the treated alfalfa for four days; after the feeding period the number of dead and live larvae in each container was recorded. If a larva did not respond to tactile stimulation, it was regarded as dead. If a larva was moribund but exhibited some movement when prodded, it was regarded as alive. Seventy percent mortality was regarded as indicative of an acceptable microbial insecticide product. The test results are reported in Table 4.

TABLE 4.—TOXICITY

| Sample | Spore count ×10/gm. | Spores 100 ml. ×10 | Percent mortality, 1/10 gm./100 ml. | Spores 100 ml. ×10 | Percent mortality, 1/5 gm./100 ml. |
|---|---|---|---|---|---|
| 901 | 11.6 | 1.16 | 73 | 2.32 | 96 |
| 902 | 10.5 | 1.05 | 82 | 2.10 | 90 |
| 903 | 9.6 | 0.96 | 55 | 1.92 | 78 |
| 905 | 9.2 | 0.92 | 78 | 1.84 | 86 |
| 906 | 11.3 | 1.13 | 100 | 2.26 | 100 |

EXAMPLE V

This example is included for comparative purposes to reflect the nature of the product obtained when aeration techniques which characterize the process of the invention are not employed.

One hundred twenty-one pounds of a medium consisting of 100 pounds of bran, 10 pounds of soy bean meal, 10 pounds of sugar and one pound of sodium hydroxide was sterilized with steam for ninety minutes and cooled with air to about room temperature. The pH of the sterilized medium was 10.8.

The sterilized medium was inoculated with twenty gallons of a seed tank culture *Bacillus thuringiensis* comparable to that described in Example I. The inoculated medium was spread in four trays and maintained at a temperature of about 30° C. to facilitate propagation and sporulation of the *Bacillus thuringiensis*. Three of the trays were dried for 18 hours and the fourth tray was dried for 24 hours.

No effective sporulation was achieved. On a bio-assay of the type described in Example II, the products of this example, in a concentration of twenty-five grams per 100 milliliters of water demonstrated only 4% mortality after four days. In a concentration of 12.5 grams per 100 milliliters of water, no mortality was demonstrated.

It will be appreciated that the expression *Bacillus thuringiensis* is employed generically in this specification to embrace all species and subspecies of thuringiensis, including specifically but without limitation, *Bacillus thurin-*

In general, recently developed procedures for the production ofmicrobial duction of microbial insecticides from *Bacillus thuringiensis* entail submerged culture techniques which require costly equipment and process expedients. In contrast the surface culture technique of this invention affords an effective microbial insecticide product at comparatively low cost.

EXAMPLE VI

This example is illustrative of the production of a microbial insecticide through utilization of a culture medium comprising a mixture of organic and inorganic carrier materials and conforming the following formulation:

| | Pounds |
|---|---|
| Bran | 125.0 |
| Expanded perlite | 87.0 |
| Soy bean meal | 22.5 |
| Crelose (dextrose) | 11.25 |
| Dried milk | 11.25 |
| Fish meal | 11.25 |
| Lime | 2.5 |

After sterilization, the medium was cooled and inoculated with 40 gallons of a twenty-hour seed culture prepared in the manner described in Example I. The inoculated culture was then processed in a manner corresponding to that described in Example I. More specifically the median temperature was held at about 30° C. throughout the major portion of the growth phase; a temperature range of about 30° C. being maintained for 90% of the growth period. The relative humidity of the air stream utilized was maintained at about 95%. Moisture content of the culture was initially 56% by weight, 51% by weight after 24 hours and 46% by weight after 48 hours, at which time the growth phase was terminated and the culture dried as described in Example I. The dried material was ground through successively finer screens in a Fitz-mill to produce a much finer mesh microbial insecticide product than can be produced from a bran medium alone under like conditions. Five fractions were separated as follows:

(1) 40 mesh _____ All material passed.
(2) 80 mesh _____ 70% passed.
(3) 100 mesh _____ 50% passed.
(4) 150 mesh _____ 23% passed.
(5) 200 mesh _____ 10% passed.

The spore count of the entire ground material was $12.6 \times 10^9$ spores per gram. The spore count of the several fractions of material retained on each screen was as follows

| | Spores/gram |
|---|---|
| #1. 80 mesh (retained) | $8.5 \times 10^9$ |
| #2. 100 | $10.1 \times 10^9$ |
| #3. 150 | $9.2 \times 10^9$ |
| #4. 200 | $9.7 \times 10^9$ |
| #5. Passed 200 | $9.3 \times 10^9$ |

Standard bio-assays against the salt marsh caterpillar was carried out in the manner generally described in Example 4, demonstrated the effectiveness of the microbial insecticide product as reflected by the data reported in Table 5.

TABLE 5 a. 0.2 gm./100 ml. water
b. 0.1 gm./100 ml. water
c. 0.05 gm./100 ml. water

| Material | Dosage | Percent mortality |
|---|---|---|
| BT 927, entire material | a | 100 |
|  | b | 95 |
|  | c | 92 |
| BT 927-1, 80 (retained) | a | 94 |
|  | b | 94 |
|  | c | 64 |
| BT 927-2, 100 (retained) | a | 98 |
|  | b | 95 |
|  | c | 80 |
| BT 927-3, 150 (retained) | a | 95 |
|  | b | 94 |
|  | c | 94 |
| BT 927-4, 200 (retained) | a | 100 |
|  | b | 92 |
|  | c | 32 |
| BT 927-5, 200 (passed) | a | 92 |
|  | b | 74 |
|  | c | 49 |
| Standard 9001-A | 0.01 gm./100 ml | 82 |
| Control | Untreated | 10 |

The foregoing example demonstrates that the utilization of a mixed organic and inorganic carrier medium resulted in a microbial insecticide product of excellent spore count. Such inorganic carrier containing media normally yield a product containing from about 30% to about 50% higher spore count than products produced on organic media such as bran, in the absence of inorganic carrier materials. Moreover, the inorganic component of the medium precludes packing of the organic component and hence affords improved air flow. Inorganic materials such as perlite which are friable additionally appear to act as grinding aids and facilitate production of microbial insecticide products of high toxicity at various mesh sizes.

EXAMPLE VII

This will demonstrate the increased potency both as to spore count and insect toxicity obtained when all of the conditions and improvements described in the preceding material is critically adhered to during processing.

A. *Preparation of Inoculant Culture*

Approximately 100 ml. of a nutrient medium of the following composition was placed in each of 4–500 ml. flask.

| | Percent by weight |
|---|---|
| Water | 97.1 |
| Corn steep | 0.5 |
| Sugar | 1.5 |
| Yeast autolysate | 0.5 |
| $K_2HPO_4$ | 0.4 |
| | 100.0 |

The nutritive medium in the flasks was adjusted to pH 7.2 with sodium hydroxide, heat-sterilized, and cooled to 30° C. The sterilized medium was then inoculated with a pure culture of *Bacillus thuringiensis* spores from a soil stock culture, and the flask was placed on a shaker for eight hours to produce a flask culture from which a seed tank culture was produced.

A seed tank was filled with one hundred gallons of a nutrient medium having a pH of 7.2 and consisting of nine pounds of dextrose, four pounds of corn steep liquor, five pounds of yeast autolysate, six ounces of sodium hydroxide, three pounds of di-potassium phosphate, and thirty-eight grams of calcium chloride. Foam was controlled through the continuous addition of a commercial antifoam compound. The medium in the seed tank was sterilized for twenty minutes at 120° C. and 15 p.s.i. pressure, cooled to about 30° C. and inoculated with 400 ml. of the flask culture of *Bacillus thuringiensis.* The pH of the inoculated seed tank was 6.9. Air at a pressure of about 5 p.s.i. at a temperature of about 30° C. was introduced into the inocuated seed tank culture for about sixteen hours at a rate equivalent to a sulfite oxidation value of 1.5 (millimoles of oxygen absorbed per milliliter of medium per minute). Active growth of *Bacillus thuringiensis* was evident. The pH of the seed tank culture after sixteen hours was 7.0. The one hundred gallons of seed tank culture so produced provided the inoculant culture for the production of a microbial insecticide.

B. *Preparation of Microbial Insecticide*

Two thousand two hundred and sixty-seven pounds of a nutrient medium having a pH of 6.8 and consisting of the following ingredients was prepared:

| | | |
|---|---|---|
| Wheat bran | pounds | 1200 |
| Expanded perlite | do | 840 |
| Soybean meal | do | 136 |
| Dextrose | do | 80 |
| Lime | do | 8 |
| Sodium chloride | do | 2 |
| Calcium chloride | grams | 288 |
| Tap water | gallons | 40 |

The nutrient medium was heat sterilized for sixty minutes, cooled to 32° C. and inoculated with 100 gallons of the seed tank. The pH of the inoculated medium was 6.9, the moisture content 60% by weight, and the ambient relative humidity was 36%. This was divided equally into four bins.

First stage air was then introduced into the medium at a relative humidity of about 95% to about 100% at an average temperature of about 30° C. to about 34° C., and at an average rate of about 0.4–0.6 volume per volume of inoculated medium per minute; this was increased to 1.0–1.2 volumes after about three hours. The introduction of first stage air was continued for about 36 hours at which time the pH of the inoculated medium was 7.5, the moisture content was 53% by weight and substantial growth and sporulation of *Bacillus thuringiensis* had occurred. Throughout the thirty-six hour period during which first stage air was introduced, the temperature of the culture was maintained at an average of from about 31° C. to about 33° C.

The bins were then shifted to the drying side. Second stage air as dry as possible and having an average temperature of from about 50° C. to about 55° C. was then initiated and continued for about thirty-six hours produced a sporulated product having a moisture content of about 4% by weight and a pH of 7.0. The product which demonstrated a viable spore count of $23.4\times10^9$ spores per gram and was comminuted to 95% minus 80 mesh to provide an excellent microbial insecticide.

EXAMPLE VIII

This example is presented to illustrate the presence of a hitherto unsuspected heat stable soluble component that is toxic when ingested by certain insects, especially Diptera. Furthermore, this second component is wholly retained in the process of the invention as opposed to more conventional fermentation procedures where this component is discarded in the supernatants and wash liquors. The retention of all metabolic products as developed by the process of this invention yields an insecticide of superior potency on a spore basis and also extends the host range to cover a wider spectrum of insects. The following data illustrate these points:

ASSAY ORGANISM—HOUSE FLY

[Sample BT 9019—Produced in conventional fermentation equipment]

| | Dosage spores/gram | Percent mortality |
|---|---|---|
| Solids from fermenter: Washed and dried (baterial spores—no soluble residue). | $1.5\times10^9$ | 8 |
| | $0.75\times10^9$ | 9 |
| | $0.37\times10^9$ | 5 |
| | $0.19\times10^9$ | 9 |
| Washed and autoclaved | $1.5\times10^9$ | 10 |
| | $0.75\times10^9$ | 12 |
| | $0.37\times10^9$ | 18 |
| | $0.19\times10^9$ | 12 |
| Turbofilm processed (spores and some soluble residue). | $1.5\times10^9$ | 20 |
| | $0.75\times10^9$ | 14 |
| | $0.37\times10^9$ | 12 |
| | $0.19\times10^9$ | 8 |
| Supernate from fermenter, as is. | 2.0 ml./100 gm. medium | 73 |
| | 1.0 ml./100 gm. medium | 76 |
| | 0.5 ml./100 gm. medium | 55 |
| | 0.25 ml./100 gm. medium | 33 |
| Autoclaved | 2.0 ml./100 gm. medium | 73 |
| | 1.0 ml./100 gm. medium | 76 |
| | 0.5 ml./100 gm. medium | 55 |
| | 0.25 ml./100 gm. medium | 33 |

[Sample BT 5005—Produced by means of this invention]

| | | |
|---|---|---|
| As is | $1.5\times10^9$ | 85 |
| | $0.75\times10^9$ | 68 |
| | $0.37\times10^9$ | 33 |
| | $0.19\times10^9$ | 18 |
| Autoclaved | $1.5\times10^9$ | 65 |
| | $0.75\times10^9$ | 48 |
| | $0.37\times10^9$ | 31 |
| | $0.19\times10^9$ | 18 |
| Control | Untreated | 8 |

The above illustrates the presence of a heat stable factor which is effectively toxic to certain insects such as the house fly. It also establishes that this factor is present in the insecticide produced by means of this invention but entirely absent from the separated washed and dried spore material. Nevertheless, on a spore basis the dry material of this invention is markedly superior to the effective portion (supernate) produced in conventional fermentation equipment.

The experiment was repeated, using the salt marsh caterpillar as the host insect.

ASSAY ORGANISM—SALT MARSH CATERPILLAR

[Sample BT 9019—Produced in conventional fermentation equipment]

| | Dosage spores/gram | Percent mortality |
|---|---|---|
| Solids: Washed and air dried (bacterial spores no soluble residue). | $1.5\times10^9$ | 69 |
| | $0.75\times10^9$ | 50 |
| | $0.37\times10^9$ | 14 |
| | $0.19\times10^9$ | 8 |
| Washed and autoclaved | $1.5\times10^9$ | 2 |
| | $0.75\times10^9$ | 4 |
| | $0.37\times10^9$ | 2 |
| | $0.19\times10^9$ | 2 |
| Turbofilm process: Spores and some soluble residue. | $1.5\times10^9$ | 62 |
| | $0.75\times10^9$ | 36 |
| | $0.37\times10^9$ | 10 |
| | $0.19\times10^9$ | 13 |
| Supernatant from fermenter as is. | 10 ml./100 gm medium | 78 |
| | 5 ml./100 gm medium | 50 |
| | 2.5 ml./100 gm medium | 14 |
| Autoclaved | 10 ml./100 gm medium | 2 |
| | 5 ml./100 gm medium | 10 |
| | 2.5 ml./100 gm medium | 0 |

[Sample BT 5005—Prepared by process of this invention]

| | | |
|---|---|---|
| As is | $1.5\times10^9$ | 92 |
| | $0.75\times10^9$ | 52 |
| | $0.37\times10^9$ | 20 |
| | $0.19\times10^9$ | 4 |
| Autoclaved | $1.5\times10^9$ | 7 |
| | $0.75\times10^9$ | 2 |
| | $0.37\times10^9$ | 4 |
| | $0.19\times10^9$ | 4 |
| Check | Untreated | 2 |

Here the presence in the solids as well as in the supernate of a heat labile factor toxic to the caterpillar but not to the house fly is shown. The toxic factor of conventionally produced insecticide which is present in the solids was heretofore discarded. But there is more to the present invention than the mere retention of all components as may be seen from the data. Not only is a product containing both toxic components produced, but the potency of the material is increased over that of the material produced by the conventional method.

In the autoclaving tests the material was held for ten minutes in an autoclave heated by steam at 15 p.s.i.g. Unless otherwise noted, the percent mortality was determined after four days.

In preparing the substrate or carrier, the material may be of larger mesh size than that for the final product. While it should not be too coarse, the larger particles and absence or minimization of fines renders the bed more open and hence provides for greater uniformity of air distribution. For example −8 +20 mesh is a suitable mesh size. If the air pressure is not too high, channeling is avoided. Where substantially higher inlet air pressure is used channeling may be encountered with resultant failure to develop the full strength of the insecticide.

The specific examples herein should not be construed as unduly limiting the invention.

I claim:

1. A process for producing a microbial insecticide which comprises absorbing on a particulate carrier substrate a nutrient inoculum containing *Bacillus thuringiensis*, the moisture content of said substrate being about 55–62% by weight of the mixture, passing first stage air at a pressure not in excess of about five pounds per square inch through said substrate-inoculated particles at a temperature of from about 25° C. to about 35° C., said air having a relative humidity of at least about 70%, for a period of time from about 25 hours to about 48 hours until substantial sporulation occurs, thereafter passing second stage air through the mass at a temperature substantially higher than that of said first stage air but not exceeding about 60° C. until the moisture content of the mass is reduced to a point below about 10% by weight, said second stage air having a relative humidity substantially lower than that of said first stage air, and recovering the dried insecticide.

2. The process of claim 1 wherein the particulate material undergoing sporulation is maintained at a temperature of about 30° C. to about 34° C.

3. The process of claim 1 wherein the sporulation is carried out for a period of about 30 to about 48 hours.

4. The process of claim 1 wherein the first stage air has a relative humidity of at least about 95%.

5. A process of claim 1 wherein the particulate substrate comprises a material of vegetable origin.

6. A process of claim 1 wherein the particulate substrate comprises a friable inorganic substance.

7. The process of claim 5 wherein the vegetable material is bran.

8. The process of claim 6 wherein the particulate substrate comprises expanded perlite.

9. A process of claim 1 wherein the first stage air is passed through the particulate mass at a rate of about 0.5 to about 1.0 volumes per volume of said mass.

10. A process for producing a microbial insecticide which comprises providing a particulate carrier substance bearing on the surface thereof a nutrient medium for *Bacillus thuringiensis*, inoculating said medium on said carrier substance with *Bacillus thuringiensis*, passing first stage air at a pressure not in excess of about five p.s.i. into said particulate carrier substance bearing said inoculated medium until substantial sporulation occurs, said first stage air being introduced into said carrier substance at a temperature of from about 25° C. to about 35° C. and at a relative humidity of at least about 70%, maintaining particulate carrier substance at a temperature of from about 25° C. to about 35° C. substantially throughout the passage of said first stage air thereinto, thereafter passing second stage air having a relative humidity substantially lower and a temperature not in excess of about 60° C. but substantially higher than that of said first stage air through said sporulated nutrient medium and carrier substance to reduce the moisture content thereof to not more than about 10% by weight.

11. The process of claim 10 wherein said first stage air is passed into said carrier substance at a temperature of about 28° C. to about 30° C.

12. The process of claim 10 wherein the passage of said first stage air into said carrier substance is discontinued after a time period of from about 40 to about 60 hours and wherein said process is completed in not more than about 100 hours.

13. The process of claim 10 wherein said first stage air is introduced into carrier substance only after the temperature thereof has risen at least about three to about five degrees centigrade after inoculation by reason of growth of *Bacillus thuringiensis*.

14. The process of claim 13 wherein said first stage air is introduced into said inoculated nutrient medium-bearing carrier substance only after the temperature thereof has reached at least about 35° C.

15. The process of claim 10 wherein the sporulated product, subsequent to the passage of second stage air therethrough, is comminuted to provide a microbial insecticide.

16. The process of claim 10 wherein the passage of second stage air through said sporulated nutrient medium and carrier substance is continued until the moisture content thereof is reduced to not more than 5% by weight.

17. The process of claim 1 in which the dried insecticide is further comminuted.

18. The process of claim 1 wherein the carrier substrate is a mixture of particulate expanded perlite and bran.

References Cited in the file of this patent

Zinsser: Textbook of Bacteriology, 7th ed., 1935, pages 1151–1152.

Chemical and Engineering News, 36: 51, December 22, 1958, page 15.

Fleschner: Science, vol. 129, number 3348, Feb. 27, 1959, pages 537–544.

Kushner et al.: J. Gen. Microbiology 21, 1959, page 96.